United States Patent
Kimizuka

(10) Patent No.: US 6,296,017 B2
(45) Date of Patent: Oct. 2, 2001

(54) VALVE UNIT AND SYNTHETIC RESIN VALVE SEAT

(75) Inventor: Genichi Kimizuka, Kawaguchi (JP)

(73) Assignee: Enplas Corporation (JP)

( * ) Notice: Subject to any disclaimer, the term of this patent is extended or adjusted under 35 U.S.C. 154(b) by 0 days.

(21) Appl. No.: 09/739,424

(22) Filed: Dec. 18, 2000

(30) Foreign Application Priority Data

Dec. 27, 1999 (JP) .................................................. 11-368972

(51) Int. Cl.[7] .................................................. F16K 11/074
(52) U.S. Cl. .................................... 137/625.17; 137/625.4
(58) Field of Search .............................. 137/625.17, 625.4

(56) References Cited

U.S. PATENT DOCUMENTS

| | | | |
|---|---|---|---|
| 4,921,016 | * | 5/1990 | Gnauert et al. ................... 137/625.17 |
| 4,986,306 | * | 1/1991 | Ferrari ............................. 137/625.17 |
| 5,080,134 | * | 1/1992 | Orlandi ............................ 137/625.17 |
| 5,435,348 | * | 7/1995 | Nakamura et al. ............... 137/625.17 |
| 5,887,620 | * | 3/1999 | Niwa et al. ......................... 137/625.4 |
| 5,893,386 | * | 4/1999 | Caria et al. ................... 137/625.17 X |
| 6,019,132 | * | 2/2000 | Knapp ............................. 137/625.17 |

* cited by examiner

Primary Examiner—John Rivell
(74) Attorney, Agent, or Firm—Bachman & LaPointe, P.C.

(57) ABSTRACT

A highly durable, inexpensive valve seat and valve unit are achieved by using a synthetic resin for forming the valve seat. The synthetic resin valve seat is equipped with a first valve aperture and a second valve aperture for inflow, and a third valve aperture for outflow. At least either the first valve aperture or the second valve aperture is set in communication with the third valve aperture through a communication hole of a movable valve seat, or the first and second valve apertures are closed by the movable valve seat. A protuberance that slidably contacts the movable valve seat is formed on a surface of the synthetic resin valve seat that opposes the movable valve seat and on the opening edges of at least the first valve aperture and the second valve aperture such that the protuberance surrounds the first valve aperture and the second valve aperture.

4 Claims, 4 Drawing Sheets

VALVE UNIT AND SYNTHETIC RESIN VALVE SEAT

BACKGROUND OF THE INVENTION

1 Field of the Invention

The present invention relates to a valve unit used in a two-liquid mixing tap unit or mixing faucet for mixing two different liquids, such as hot water and cold water, and a synthetic resin valve seat used with the valve unit.

2. Description of Related Art

In general, a hot and cold water mixing plug unit (two-liquid mixing tap unit) installed in a household lavatory includes a valve unit constructed to be able to mix hot water and cold water to provide warm water.

In such a valve unit used with the hot and cold water mixing plug unit, a fixed valving element equipped with an inflow hot water valve aperture, an inflow cold water valve aperture, and an outflow mixed water valve aperture is secured in a valve case. Furthermore, a movable valving element that is movably operated by an operating means, such as a handle, is accommodated in the valve case so that it comes in slidable contact with the fixed valving element. The valve unit is constructed such that, when the movable valving element is moved to a valve opening position by the operating mean, at least either the hot water valve aperture or the cold water valve aperture becomes in communication with the mixed water valve aperture through a communication aperture in the movable valving element. When the movable valving element is moved to a valve closing position by the operating means, the movable valving element closes the hot water valve aperture and the cold water valve aperture.

A conventionally known valve unit disclosed, for example, in Japanese Unexamined Patent Publication No. 8-200526 or Japanese Unexamined Patent Publication No. 8-14422, a ceramic valve seat is disposed on each slide contact surface of the fixed valving element and the movable valving element, respectively, thereby to improve the durability of the slide contact portions of the fixed valving element and the movable valving element so as to eventually improve the durability of a valve unit itself.

Regarding the ceramic valve seat used with the valve unit, however, the profile irregularity of the slide contact surface thereof directly influences water-tightness. For this reason, after a sintering and forming process, the slide contact surface is polished with high accuracy and provided with plating. Hence, the ceramic valve seats require extra processing steps, making them more expensive than other components of a valve unit. In particular, the ceramic valve seat disposed on the fixed valving element has a hot water valve aperture, a cold water valve aperture, and a mixed water valve aperture, so that the configuration thereof is complicated, making it more expensive than the ceramic valve seat disposed in the movable valving element.

SUMMARY OF THE INVENTION

Accordingly, an object of the present invention is to provide an inexpensive synthetic resin valve seat featuring high durability and water-tightness by forming the valve seat using synthetic resin and by employing an ingenious configuration, and a valve unit equipped with the synthetic resin valve seat.

According to one aspect of the present invention, there is provided a valve unit including a valve case that accommodates a fixed valve seat secured therein and a movable valve seat movably installed therein such that these valve seats slidably contact each other. Further, the fixed valve seat have first and second valve aperture for inflow, and a third valve aperture for outflow. The movable valve seat is provided with a communication aperture that causes at least either the first valve aperture or the second valve aperture to be in communication with the third valve aperture when a valve is opened, while causing itself to be in communication only with the third valve aperture when the valve is closed. Further, the movable valve seat is moved to a valve opening position or a valve closing position by opening and closing means. In this configuration, at least the fixed valve seat out of the fixed valve seat and the movable valve seat is formed of a synthetic resin. Further, a protuberance that surrounds the first valve aperture and the second valve aperture is formed on at least the opening edges of the first valve aperture and the second valve aperture on a surface of the fixed valve seat that opposes the movable valve seat.

In a preferred form of the valve unit according to the present invention, a supporting protuberance that slidably support, in cooperation with the protuberance s the movable valve seat is formed on the surface of the fixed valve seat that opposes the movable valve seat.

According to another aspect of the present invention, there is provided a synthetic resin valve seat equipped with a first valve aperture and a second valve aperture for inflow and a third valve aperture for outflow, at least either the first valve aperture or the second valve aperture being placed in communication with the third valve aperture by a movable valving element, or the first and second valve apertures being closed by the movable valving element. Further, a protuberance that slidably contacts the movable valving element is formed on opening edges of at least the first valve aperture and the second valve aperture, on a surface that opposes the movable valving element such that the protuberance surround the first valve aperture and the second valve aperture.

In a preferred form of the synthetic resin valve seat according to the present invention, a supporting protuberance that slidably contacts the movable valving element together with the protuberance is formed on the surface that opposes the movable valving element.

BRIEF DESCRIPTION OF THE DRAWINGS

FIG. 4 is a diagram illustrating a positional relationship between the movable valve seat and the fixed valve seat when the valve is open, wherein

FIG. 8 present top plan views of fixed valve seats of other embodiments according to the present invention, wherein

DESCRIPTION OF THE PREFERRED EMBODIMENTS

The following will describe the embodiments in accordance with the present invention in conjunction with the accompanying drawings. [First Embodiment]

FIG. 1 through FIG. 4 illustrate the states wherein a valve unit 1 according to a first embodiment of the present invention and a synthetic resin valve seat (a fixed valve seat) 2 used with the valve unit 1, when the valve is open.

Figure 1:
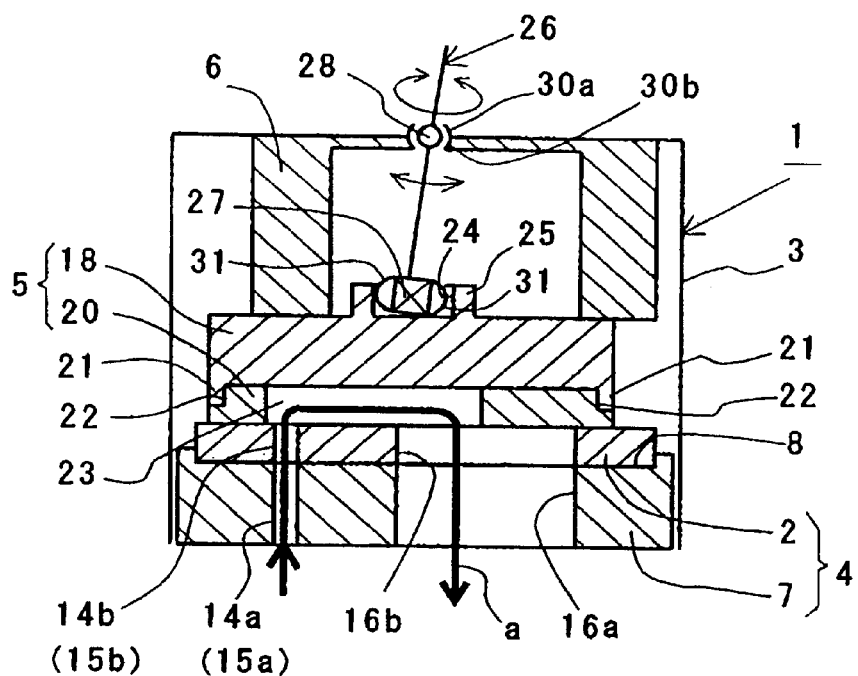
FIG. 1 is a simplified longitudinal sectional view of a part of a valve unit according to a first embodiment of the present invention when the valve is open.

Referring to FIG. 1, the valve unit 1 includes a fixed valving element 4, a movable valving element 5, and a spacer 6 that are stacked in this order in a approximately cylindrical bottomed valve case 3 that opened downward. The fixed valving element 4 is detachably secured to a bottom end of the valve case 3, the movable valving element 5 is accommodated so that it may slidably contacts the fixed valving element 4, and the spacer 6 supports the movable valving element 5 toward the fixed valving element 4.

Figure 3:
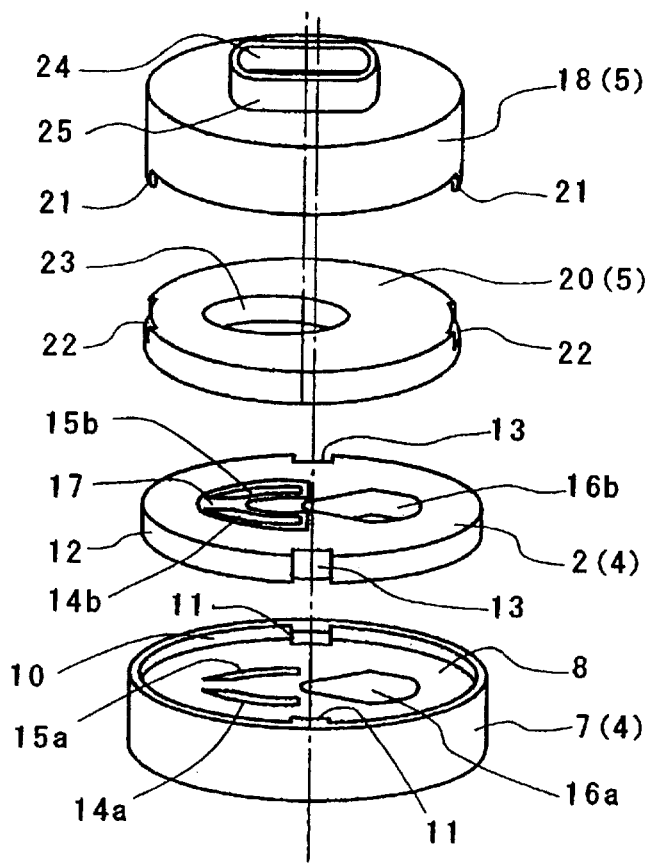
FIG. 3 is an exploded perspective view of a fixed valving element and a movable valving element.

The fixed valving element 4 is formed of a fixed valve seat holder 7 and a synthetic resin valve seat 2 approximately shaped like a disc that engages an engagement recess 8 formed in the top surface of the fixed valve seat holder 7, as shown in FIG. 3. Slits 13 and 13 formed in an outer peripheral edge 12 of the synthetic resin valve seat 2 are engaged with lugs 11 and 11 formed on a side wall 10 of the engagement recess 8 of the fixed valve seat holder 7 to position the synthetic resin valve seat 2 in relation to the fixed valve seat holder 7 and also to prevent relative rotation between the synthetic resin valve seat 2 and the fixed valve seat holder 7.

As shown in FIG. 1 through FIG. 4, the fixed valve seat holder 7 and the synthetic resin valve seat 2 combined as set forth above have first valve apertures 14a, 14b and second valve apertures 15a, 15b that are in mutual communication and are approximately arc-shaped, and third valve apertures 16a, 16b that are in mutual communication and are approximately fan-shaped. The first valve apertures 14a, 14b and the second valve apertures 15a, 15b are inflow valve apertures, while the third valve apertures 16a and 16b are outflow valve apertures.

Figure 2:
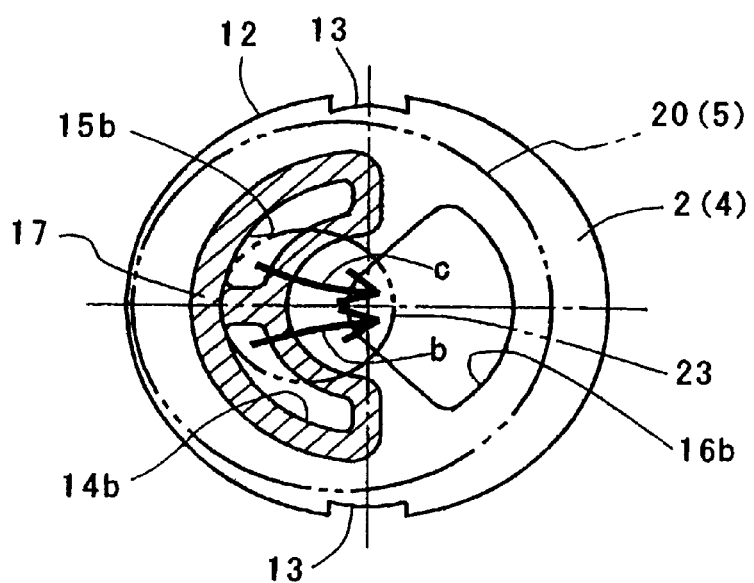
FIG. 2 is a top plan view of a fixed valve seat illustrating a state wherein a first valve aperture, a second valve aperture, and a third valve aperture are placed in communication by a movable valve seat.
Figure 7:
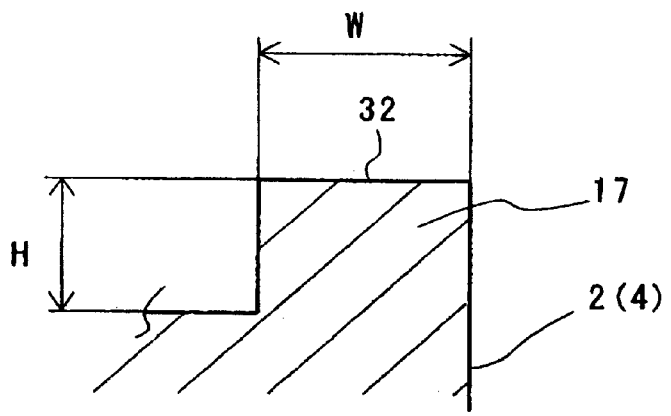
FIG. 7 is an enlarged sectional view of a protuberance formed on the fixed valve seat.

In the synthetic resin valve seat 2, as shown in FIG. 2, a protuberance 17 indicated by a hatched portion in FIG. 2 is formed on a surface opposing the movable valving element 5 (the top surface in FIG. 1 and FIG. 3) and on opening edges of the first valve aperture 14b and the second valve aperture 15b such that it surrounds the first valve aperture 14b and the second valve aperture 15b. As illustrated in more detail in FIG. 7, the protuberance 17 approximately has a rectangular section, and has a width W set to 1 to 2 mm and a height H set to 0.05 to 0.1 mm in relation to the 26 mm outer diameter of the synthetic resin valve seat 2. The dimensions W and H of the protuberance 17 are not limited to the above; optimum dimensions are determined according to the outer diameter of the synthetic resin valve seat 2 and various design conditions, including water pressure.

As shown in FIG. 3, the movable valving element 5 is formed of a movable valve seat holder 18 and a movable valve seat 20 engaged with the bottom surface of the movable valve seat holder 18. Engaging lugs 21 formed on the bottom surface of the movable valve seat holder 18 are engaged with engaging recesses 22 formed on the top surface of the movable valve seat 20 to position the movable valve seat 20 in relation to the movable valve seat holder 18 and to prevent relative rotation between the movable valve seat 20 and the movable valve seat holder 18.

The movable valve seat 20 has a communication hole 23 that causes the first valve aperture 14b and the second valve aperture 15b of the synthetic resin valve seat 2 constituting the fixed valving element 4 to be in communication with the third valve aperture 16b, as shown in FIG. 1 through FIG. 3. In this embodiment, the movable valve seat 20 that slidably contacts the synthetic resin valve seat 2 of the fixed valving element 4 is formed using a ceramic material. The movable valve seat 20, however, may be composed of other material, such as a synthetic resin.

The movable valve seat holder 18 has, in its top surface, a lever engaging portion 25 that has an oblong longitudinal opening 24, as shown in FIG. 1 and FIG. 3. A double-face portion 27 of a lever 26 engages the lever engaging portion 25. The movable valve seat holder 18 is moved within the valve case 3 by the lever 26 engaging the lever engaging portion 25.

The double-face portion 27 formed on one end of the lever 26 engages the lever engaging portion 25, and the other end of the lever 26 that projects out of the valve case 3 is connected to an operating lever handle or the like (not shown). A spherical portion 28 formed at a middle of the lever 26 is supported by bearings 30a and 30b formed on the valve case 3 and the spacer 6 so that the lever 26 can swivel and circularly move about the spherical portion 28. As shown in FIG. 1, both end portions 31 of the double-face portion 27 are formed into an arc shape to allow the lever 26 to smoothly operate the movable valve seat holder 18. Furthermore, the lever 26 constitutes, in cooperation with the operating lever handle or the like (not shown), a valve opening and closing means.

Figures 4A, 4B:
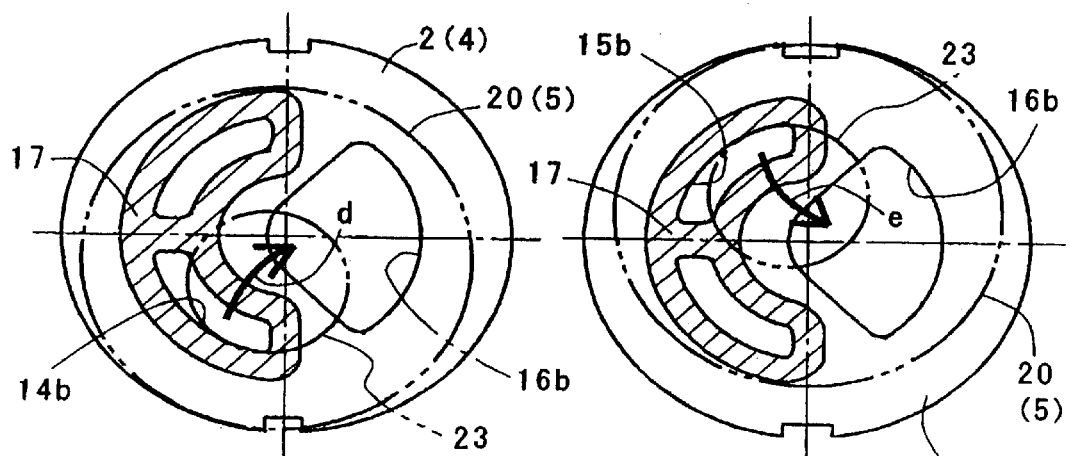
FIG. 4A is a top plan view of the fixed valve seat illustrating a state wherein the first valve aperture and the third valve aperture are placed in communication by the movable valve seat.
FIG. 4B is a top plan view of the fixed valve seat illustrating a state wherein the second valve aperture and the third valve aperture are placed in communication by the movable valve seat.
Figure 5:
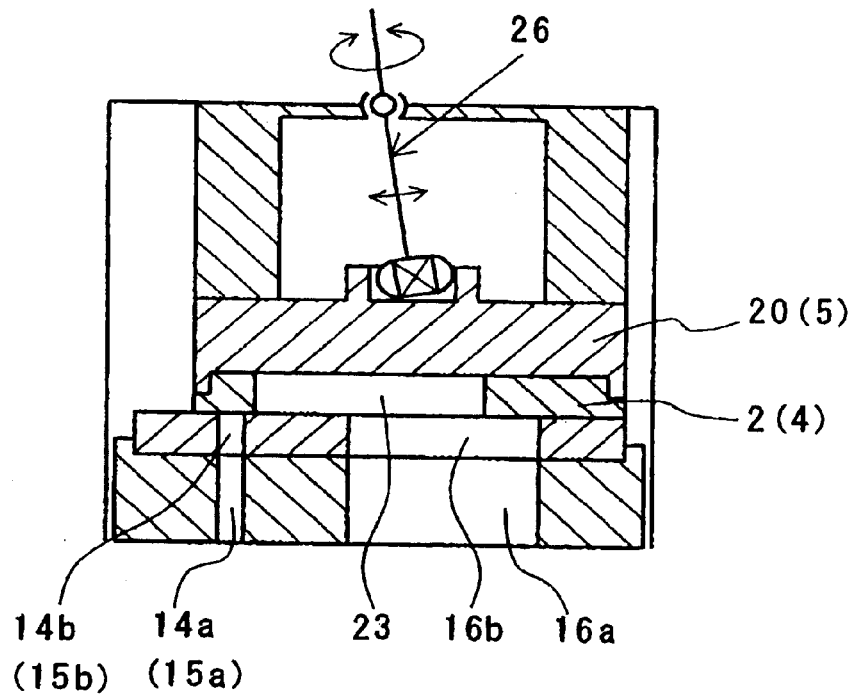
FIG. 5 is a simplified longitudinal sectional view of a part of the valve unit according to the first embodiment of the present invention when the valve is closed.
Figure 6:
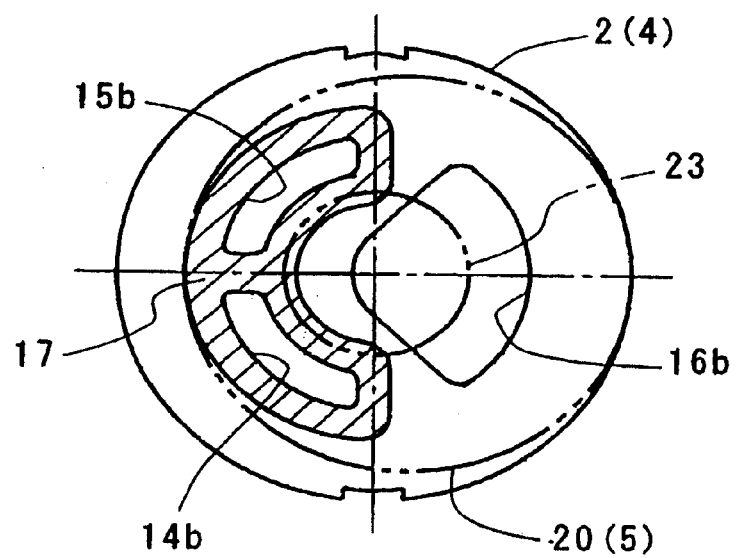
FIG. 6 is a top plan view of the fixed valve seat illustrating a state wherein the first valve aperture and the second valve aperture are closed by the movable valve seat.

Since the valve unit 1 is constructed as described above, by circularly moving the lever 26 of FIG. 1 counterclockwise in a state shown in FIG. 2, the movable valving element 5 can be circularly moved counterclockwise with respect to the fixed valving element 4 so as to cause only the first valve aperture 14b to be in communication with the third valve aperture 16b via the communication hole 23, as shown in FIG. 4A. By circularly moving the lever 26 of FIG. 1 clockwise in a state shown in FIG. 2, the movable valving element 5 can be circularly moved clockwise with respect to the fixed valving element 4 so as to cause only the second valve aperture 15b to be in communication with the third valve aperture 16b via the communication hole 23, as shown in FIG. 4B. Furthermore, by swiveling the lever 26 in the state illustrated in FIG. 1 and FIG. 2, the movable valve seat 20 can be moved to the right in FIG. 2 on the synthetic resin valve seat 2 and set in the state illustrated in FIG. 5 and FIG. 6, the slide contact surface of the movable valve seat 20 closes the first valve aperture 14b and the second valve aperture 15b, causing the communication hole 23 to be in communication with only the third valve aperture 16b so as to close the valve. If, for example, the first valve apertures 14a and 14b are for hot water, the second valve apertures 15a and 15b are for cold water, and the third valve apertures 16a and 16b are for mixed water, then warm water consisting of a mixture of hot water and cold water in the same amount flows out through the mixed water valve aperture 16b in a state illustrated in FIG. 2 (refer to reference characters "b", "c", and "a" in FIG. 1). In the state shown in FIG. 4A, only hot water flows out through the mixed water valve aperture 16b (refer to reference character "d"). In the state shown in FIG. 4B, only cold water flows out through the mixed water valve aperture 16b (refer to reference character "e"). In the state shown in FIG. 2, if the lever 26 is circularly moved to slightly move the movable valve seat 20 up or down in the drawing, then the mixing ratio of hot water and cold water is changed, so that the temperature of warm water changes accordingly. Furthermore, in the state shown in FIG. 2, if the lever 26 is swiveled to slightly move the movable valve seat 20 to the right in the drawing, then the flow rate of hot water and cold water is decreased, so that the amount of warm water flowing out through the mixed water valve aperture 16b is decreased accordingly.

Thus, according to the present invention, the synthetic resin valve seat 2 is employed as the valve seat constituting the fixed valving element 4, the protuberance 17 is formed on the surface opposing the movable valve seat 20 and on the opening edges of the first valve aperture 14b and the second valve aperture 15b such that it surrounds the first valve aperture 14b and the second valve aperture 15b, and the protuberance 17 slidably contacts the movable valve seat 20 to seal the first valve aperture 14b and the second valve aperture 15b, the protuberance 17 elastically deforming to follow the slide surface of the movable valve seat 20. Thus, the protuberance 17 that elastically deforms exhibits outstanding sealing performance.

In this embodiment, the fixed valve seat 2 that slidably contacts the movable valve seat 20 is composed of a synthetic resin as set forth above, so that the self-lubricating properties of the synthetic resin permits smooth valving operation (opening and closing of the first valve aperture 14b and the second valve aperture 15b) for an extended period of time.

Moreover, in this embodiment, the protuberance 17 of the synthetic resin valve seat 2 slidably contacts the movable valve seat 20 to seal the first valve aperture 14b and the second valve aperture 15b. Hence, only a surface 32 of the protuberance 17 that comes in contact with the movable valve seat 20 is required to have high surface accuracy, obviating the need for machining with high accuracy the entire surface of the synthetic resin valve seat 2 that opposes the movable valve seat 20. Moreover, as mentioned above, the protuberance 17 of the synthetic resin valve seat 2 elastically deforms to be in close contact with the slide surface of the movable valve seat 20; therefore, the surface 32 of the protuberance 17 that contacts the movable valve seat does not have to have as high surface accuracy as that of the ceramic valve seat. In addition, in the injection molding of a synthetic resin, it is easier to mold with high accuracy a portion with a smaller area than a portion with a larger area; hence, the small protuberance 17 of the synthetic resin valve seat 2 can be formed by injection molding with higher accuracy than the remaining portions of the synthetic resin valve seat 2. Thus, according to this embodiment, the synthetic resin valve seat 2 can be completed simply by injection molding, making it possible to markedly reduce the number of machining steps as compared with the conventional ceramic valve seats. As a result, the fixed valve seat 2 used for the fixed valving element 4 can be reduced in cost, thus permitting the price of the valve unit 1 to be reduced.

Furthermore, according to the embodiment, the protuberance 17 of the synthetic resin valve seat 2 slidably contacts the movable valve seat 20 as set forth above. Therefore, even if an ejecting pin leaves a pressing mark on the surface of the synthetic resin valve seat 2 that opposes the movable valve seat 20 when the synthetic resin valve seat 2 is pushed out of an injection mold by the ejecting pin, the mark will not adversely affect the function of the synthetic resin valve seat 2.

The embodiment has demonstrated a case in which the first valve apertures 14a, 14b and the second valve apertures 15a, 15b are substantially formed to have the arc shape, the third valve apertures 16a, 16b are substantially formed to have the fan shape, and the communication hole 23 is formed to have the circular shape. The present invention, however, is not limited to the above, and the shapes of the first through third valve apertures 14a through 16b and the communication hole 23 may be changed as necessary according to an inflow passage area and an outflow passage area, and various designing conditions.

Furthermore, this embodiment has illustrated an example wherein the synthetic resin valve seat 2 and the movable valve seat 20 are substantially formed to circular external shapes. The external shapes of the synthetic resin valve seat 2 and the movable valve seat 20, however, are not limited to the above, and they may be changed designing conditions, such as an accommodating space of the valve unit 1, as along as the shapes enable the valve sheets to fulfill their functions.

This embodiment has illustrated an example wherein the sectional configuration of the protuberance 17 has been substantially formed to be rectangular. The protuberance 17 may, however, have a different sectional shape (e.g. trapezoidal shape) that does not cause a significant change in an area of contact with the movable valve seat 20 even when the protuberance 17 wears out.

In this embodiment, the fixed valve seat holder 7 is screwed to or engaged in a concavo-convex manner with the valve case 3 so that it is detachably secured to the valve case 3.

Figures 8A, 8B:
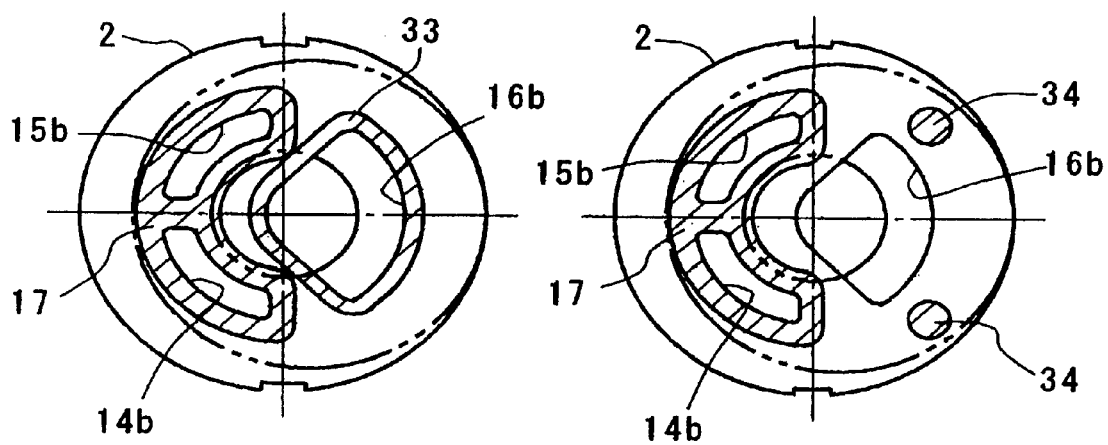
FIG. 8A is a top plan view of the fixed valve seat demonstrating a second embodiment of the present invention.
FIG. 8B is a top plan view of the fixed valve seat demonstrating a third embodiment of the present invention.

In the first embodiment, if the height of the protuberance 17 surrounding the first valve aperture 14b and the second valve aperture 15b is increased according to designing conditions, and the tilt of the movable valve seat 20 (the movable valve seat 20 tilts by the height of the protuberance 17 when it slidably contacts the synthetic resin valve seat 2) may adversely affect the valving performance, then it is desirable to employ the configuration shown in FIG. 8A or FIG. 8B.

More specifically, FIG. 8A shows a second embodiment in accordance with the present invention in which a supporting protuberance 33 similar to the protuberance 17 formed on the opening edges of the first valve aperture 14b and the second valve aperture 15b is also formed on the opening edge of the third valve aperture 16b of the synthetic resin valve seat 2. This additional protuberance prevents the movable valve seat 20 from falling. The supporting protuberance 33 formed on the opening edge of the third valve aperture 16b does not have to be in a continuous full size; alternatively, the protuberance may be partially formed as long as it is able to prevent the movable valve seat 20 from falling.

FIG. 8B shows a third embodiment in accordance with the present invention in which a plurality of supporting protuberances 34 having the same height as the protuberance 17, which is formed on the opening edges of the first valve aperture 14b and the second valve aperture 15b, are formed at places farther toward the outer periphery than the third valve aperture 16b of the synthetic resin valve seat 2 is located. This makes it possible to prevent the movable valve seat 20 from falling. The configuration of the supporting protuberances 34 is not limited to a circular shape; it may be any other shape as long as it enables the protuberances 34 to prevent the movable valve seat 20 from falling.

The above embodiment has demonstrated a case where the valve unit 1 is used for the hot water and cold water mixing tap as a two-liquid mixing tap. The present invention, however, can be extensively used with a two-liquid mixing tap adapted to cause a liquid coming in through both or one of the first valve apertures 14a, 14b and the second valve apertures 15a, 15b for inflow to go out through the third valve apertures 16a and 16b for outflow.

Thus, according to the present invention, at least a fixed valve seat is formed of a synthetic resin, and a protuberance is formed on the surface of the synthetic resin valve seat that opposes a movable valve seat 20 and on the opening edges of a first valve aperture and a second valve aperture such that the protuberance surrounds the first valve aperture and the second valve aperture. Hence, the protuberance elastically deforms to follow the slide surface of the movable valve seat, exhibiting good sealing performance.

Furthermore, according to the present invention, the fixed valve seat is composed of a synthetic resin, so that the self-lubricating properties of the synthetic resin permits smooth valving operation (opening and closing of the first valve aperture and the second valve aperture) for an extended period of time.

Moreover, according to the present invention, the synthetic resin valve seat serving as the fixed valve seat can be formed simply by injection molding. Hence, the number of machining steps can be significantly reduced as compared with the case where a conventional ceramic valve seat is used. As a result, the price of the fixed valve seat can be reduced, thus allowing permitting the price of the valve unit to be reduced.

What is claimed is:

1. A valve unit comprising:
   a valve case that accommodates a fixed valve seat secured therein and a movable valve seat movably installed therein such that these valve seats slidably contact each other;
   the fixed valve seat having first and second valve aperture for inflow, and a third valve aperture for outflow;
   the movable valve seat being provided with a communication aperture that causes at least either the first valve aperture or the second valve aperture to be in communication with the third valve aperture when a valve is opened, while causing itself to be in communication only with the third valve aperture when the valve is closed; and
   the movable valve seat being moved to a valve opening position or a valve closing position by opening and closing means,
   wherein at least the fixed valve seat out of the fixed valve seat and the movable valve seat is formed of a synthetic resin; and
   a protuberance that surrounds the first valve aperture and the second valve aperture is formed on at least the opening edges of the first valve aperture and the second valve aperture on a surface of the fixed valve seat that opposes the movable valve seat.

2. A valve unit according claim 1, wherein a supporting protuberance that slidably supports, in cooperation with the protuberance, the movable valve seat is formed on the surface of the fixed valve seat that opposes the movable valve seat.

3. A synthetic resin valve seat comprising:
   a first valve aperture and a second valve aperture for inflow and a third valve aperture for outflow, at least either the first valve aperture or the second valve aperture being placed in communication with the third valve aperture by a movable valving element, or the first and second valve apertures being closed by the movable valving element,
   wherein a protuberance that slidably contacts the movable valving element is formed on an opening edge of at least the first valve aperture and the second valve aperture, on a surface that opposes the movable valving element such that the protuberance surrounds the first valve aperture and the second valve aperture.

4. A synthetic resin valve seat according to claim 3, wherein a supporting protuberance that slidably contacts the movable valving element together with the protuberance is formed on the surface that opposes the movable valving element.

* * * * *